(12) United States Patent
Lin

(10) Patent No.: US 8,235,700 B2
(45) Date of Patent: Aug. 7, 2012

(54) MOLD FOR FORMING AN OPTICAL FIBER CONNECTOR

(75) Inventor: I-Thun Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 44 days.

(21) Appl. No.: 12/965,904

(22) Filed: Dec. 12, 2010

(65) Prior Publication Data

US 2012/0034334 A1    Feb. 9, 2012

(30) Foreign Application Priority Data

Aug. 6, 2010   (TW) ................................ 99126323 A

(51) Int. Cl.
B29C 45/36    (2006.01)

(52) U.S. Cl. ......................... 425/190; 425/468; 425/577

(58) Field of Classification Search .................. 425/190, 425/468, 577
See application file for complete search history.

(56) References Cited

U.S. PATENT DOCUMENTS

| 4,711,752 | A  | * | 12/1987 | Deacon et al. | 264/328.12 |
| 5,269,998 | A  | * | 12/1993 | Takagi et al. | 264/328.1 |
| 5,786,002 | A  | * | 7/1998  | Dean et al. | 425/183 |
| 6,074,577 | A  | * | 6/2000  | Katsura et al. | 264/1.25 |
| 6,663,377 | B1 | * | 12/2003 | Dean et al. | 425/190 |
| 6,719,927 | B2 | * | 4/2004  | Sakurai et al. | 264/1.25 |
| 6,767,199 | B2 | * | 7/2004  | Dean et al. | 425/192 R |
| 7,086,847 | B2 | * | 8/2006  | Dean et al. | 425/190 |
| 2011/0062606 | A1 | * | 3/2011 | Martinez et al. | 264/1.28 |
| 2011/0097432 | A1 | * | 4/2011 | Yu et al. | 425/116 |
| 2011/0236521 | A1 | * | 9/2011 | Wu | 425/446 |
| 2011/0241257 | A1 | * | 10/2011 | Miyagawa | 264/400 |
| 2011/0244068 | A1 | * | 10/2011 | Lin | 425/123 |
| 2011/0256254 | A1 | * | 10/2011 | Yen | 425/123 |
| 2011/0262577 | A1 | * | 10/2011 | Wu | 425/185 |
| 2011/0262582 | A1 | * | 10/2011 | Wu | 425/542 |
| 2011/0278749 | A1 | * | 11/2011 | Yu et al. | 264/1.26 |
| 2011/0287125 | A1 | * | 11/2011 | Lin | 425/467 |
| 2012/0040564 | A1 | * | 2/2012 | Csak | 439/660 |
| 2012/0058212 | A1 | * | 3/2012 | Lin | 425/123 |

* cited by examiner

Primary Examiner — Tim Heitbrink
(74) Attorney, Agent, or Firm — Altis Law Group, Inc.

(57) ABSTRACT

A mold for molding optical fiber connector includes a core pin, a cavity mold and a sprue hole defined on the sidewall of the cavity mold. The core pin is used to mold the blind hole of the optical fiber connector. The cavity mold and the core mold cooperatively define a molding cavity for forming the optical fiber connector. A support block is configured in the molding cavity. The molding cavity includes a lens forming portion used to mold the lens and the support block configures a cutout to support the blind hole forming portion to make the blind hole forming portion align with the lens forming portion during the molding process, the opening of the cutout is towards the sprue hole.

4 Claims, 5 Drawing Sheets

MOLD FOR FORMING AN OPTICAL FIBER CONNECTOR

BACKGROUND

1. Technical Field

The present disclosure relates to molds, and particularly, to a mold for forming an optical fiber connector.

2. Description of Related Art

Optical fiber connectors typically include a lens and a blind hole behind the lens. The blind hole receives an optical fiber. The lens receives and guides light from the optical fiber. The alignment accuracy between the blind hole and the lens is very important to the optical transmission ability of the optical fiber connectors.

Injection molding is a current molding method for molding optical fiber connectors. The mold used in injection molding includes a core pin used to mold the blind hole and a lens forming portion corresponding with the core pin. During the injection molding process, the core pin must keep alignment with the lens forming portion to make sure the alignment accuracy between the blind hole and the lens of the molded optical fiber connector.

However, the longitudinal axis of the blind hole usually deviates from an optical axis of the lens in the optical fiber connector mold by the above-mentioned method. The main reason is that the impact of the molding material during the molding process causes the core pin to bend, thus causing the longitudinal axis of the core pin inclination relative to the central axis of the lens forming portion (the central axis of the lens forming portion coincides with the optical axis of the molded lens).

Therefore, a mold for molding optical fiber connectors, which can overcome the above-mentioned problems, is needed.

DETAILED DESCRIPTION

Figure 1:
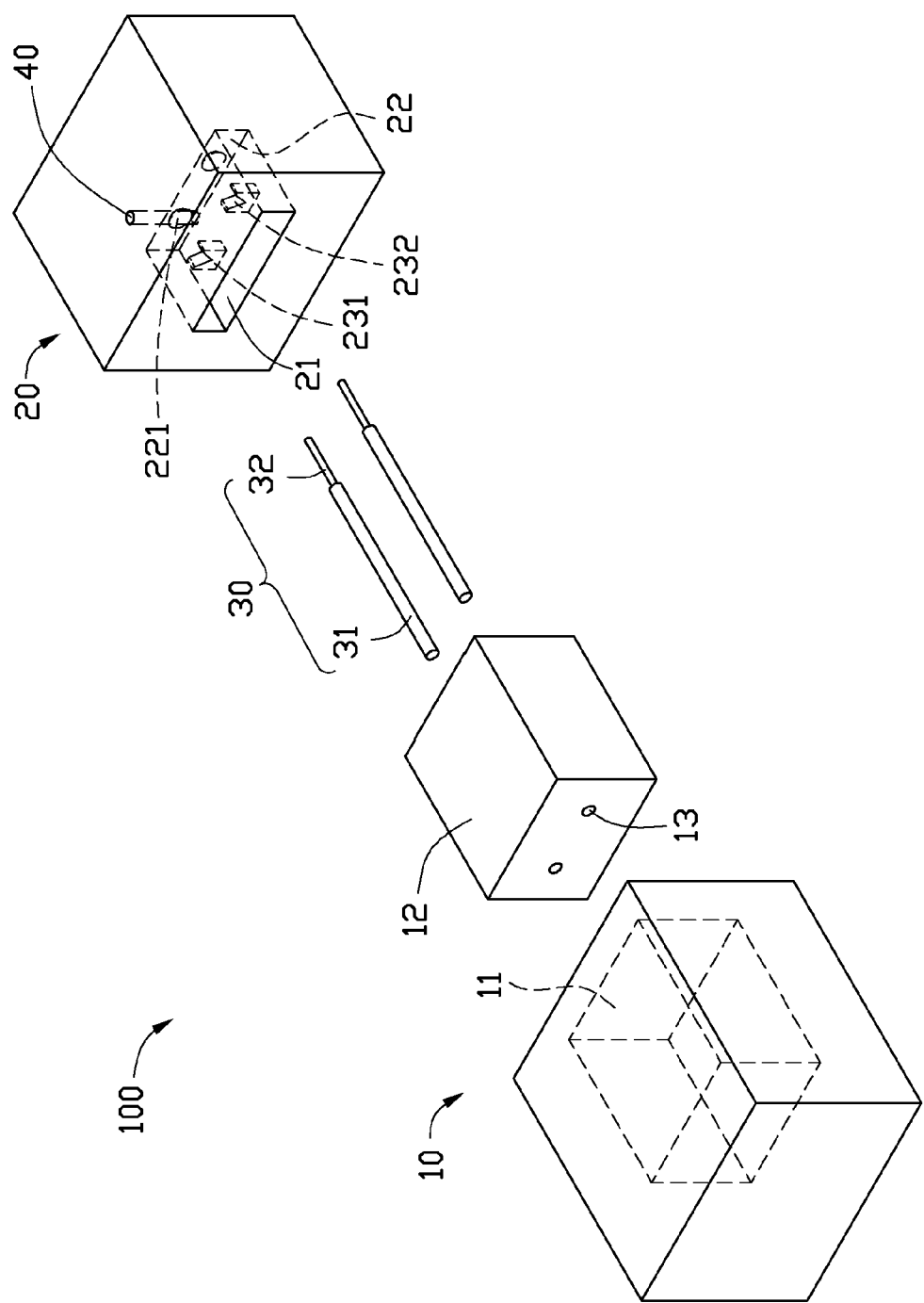
FIG. 1 is an exploded view of a mold for molding an optical fiber connector, according to the first embodiment.
Figure 2:
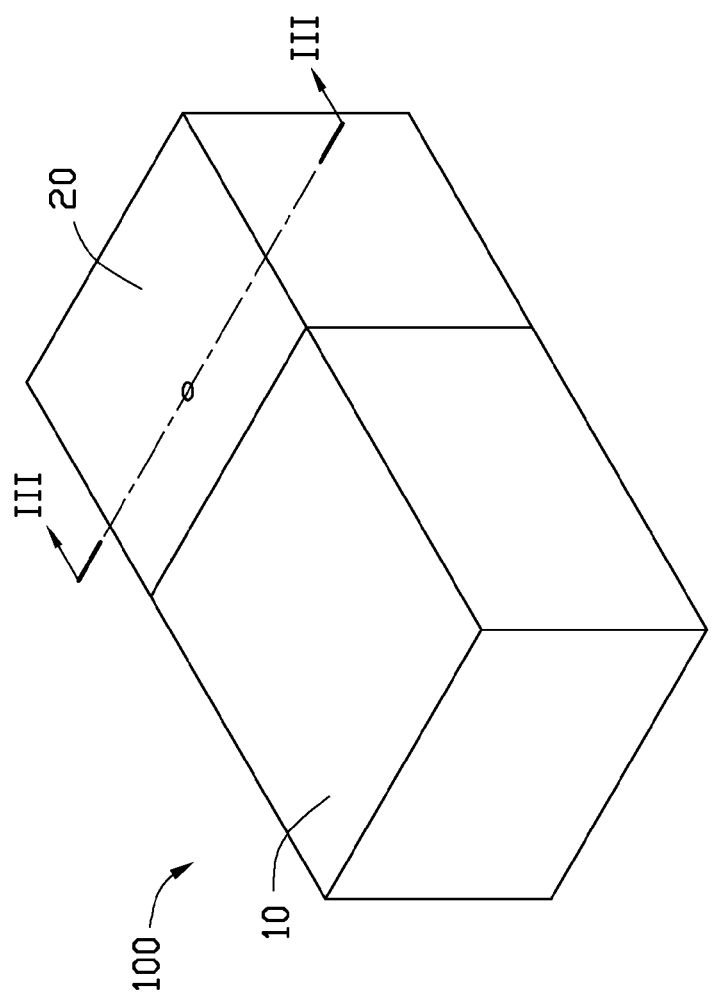
FIG. 2 is an assembled view of the mold of FIG. 1.
Figure 3:
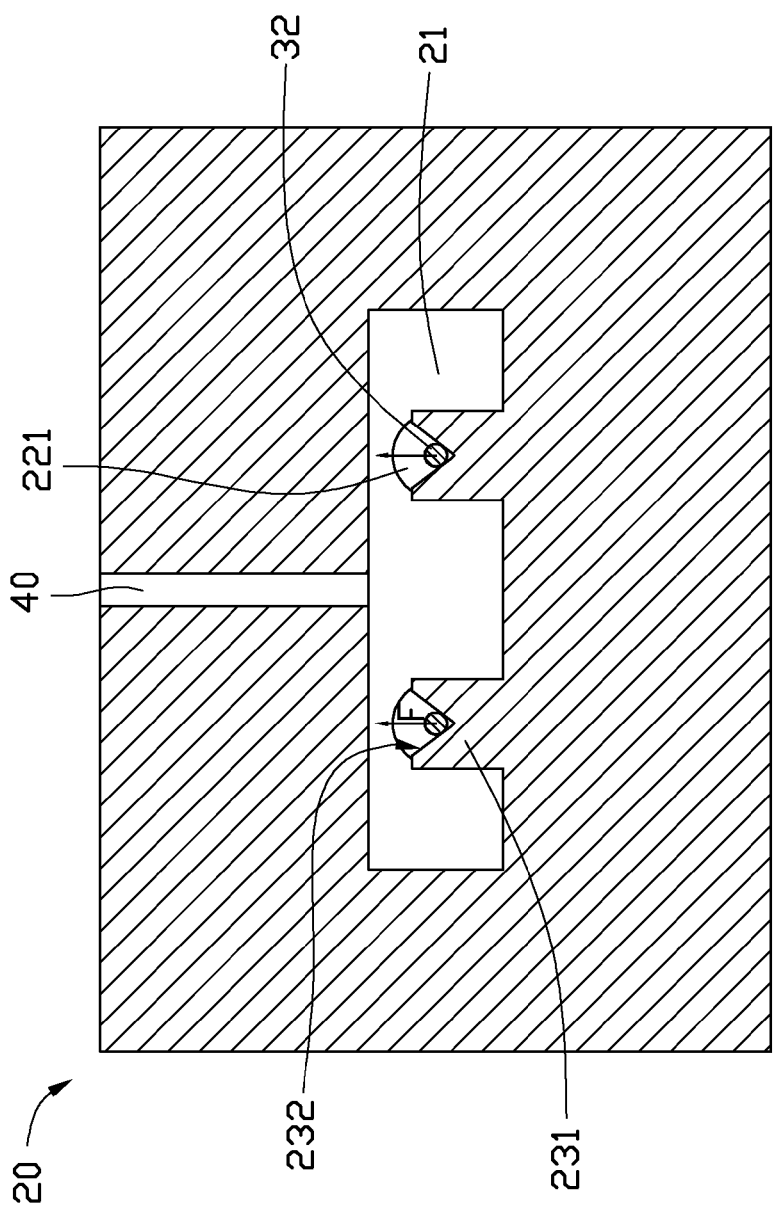
FIG. 3 is a sectional view taken along line of the mold of FIG. 2.

Referring to FIGS. 1 to 3, a mold 100, according to the first embodiment, molds an optical fiber connector (not shown). The optical fiber connector includes blind holes and lenses.

The mold 100 includes a core mold 10, a cavity mold 20 and two core pins 30. The core pin 30 includes an insertion portion 31 and a blind hole forming portion 32. The blind hole forming portion 32 is used to mold the blind hole of the optical fiber connector.

The cavity mold 20 and the core mold 10 cooperatively define a molding cavity 21 for forming the optical fiber connector. The molding cavity 21 includes a support surface 22. The support surface 22 defines two lens forming portions 221. The lens forming portion 221 is used to form the lens of the optical fiber connector. After the mold 100 is assembled, the insertion portion 31 of the core pin 30 is fixed by the core mold 10 and the blind hole forming portion 32 of the core pin 30 stretches into the molding cavity 21 and aligns with the lens forming portion 221.

In the sidewall of the cavity mold 20, a sprue hole 40 is defined and is in communication with the molding cavity 21 to allow molding material to go into the molding cavity 21. In present embodiment, the central axis of the sprue hole 40 is substantially perpendicular with the longitudinal axis of the core pin 30. It is to be understood that in alternative embodiment, the central axis of the sprue hole 40 may be not perpendicular with the longitudinal axis of the core pin 30.

The cavity mold 20 also includes two support blocks 231 in the molding cavity 21, corresponding with the two lens forming portions 221. Each support block 231 defines a V-shaped cutout 232 to support the blind hole forming portion 32 to make the blind hole forming portion 32 align with the corresponding lens forming portion 221 during the molding process. The opening of the cutout 232 is set towards the sprue hole 40. In alternative embodiments, the number of the support block 231 may be different and depends on the number of the blind holes of the optical fiber connector molded by the mold 100. When the number of the support blocks 231 is more than one, the opening of the cutout 232 defined on each support block 231 must be set towards the sidewall which defines the sprue hole 40. Furthermore, the opening of the cutout 232 defined on each support block 231 must be set towards the sprue hole 40.

During the process of molding optical fiber connector using the mold 100, the high-speed molding material flow is injected through the sprue hole 40 into the molding cavity 21 and impacts the blind hole forming portion 32 supported by the cutout 232 of the support block 231. The direction of the impact force applied on the blind hole forming portion 32 substantially along the direction of the connection line from the sprue hole 40 to the support block 231. By setting the direction of the opening of the cutout 232 towards the sprue hole 40, the support force F offered by the cutout 232 opposite to the direction of the impact force to cancel the impact force. Thus, the alignment accuracy between the longitudinal axis of the blind hole and the optical axis of the lens in the optical fiber connector molded by the mold 100 is improved.

The core mold 10 includes a containing chamber 11 and a block 12 mounted in the containing chamber 11. The block 12 defines two holes 13 corresponding with the two lens forming portions 221 of the cavity mold 20. The hole 13 is used to hold the insertion portion 31 of the core pin 30. In present embodiment, the hole 13 is a blind hole. It is to be understood that in alternative embodiments, the holes 13 may be a through hole and the number of the holes 13 may be different and depends on the pattern of the optical fiber connector molded by the mold 100.

Figure 4:
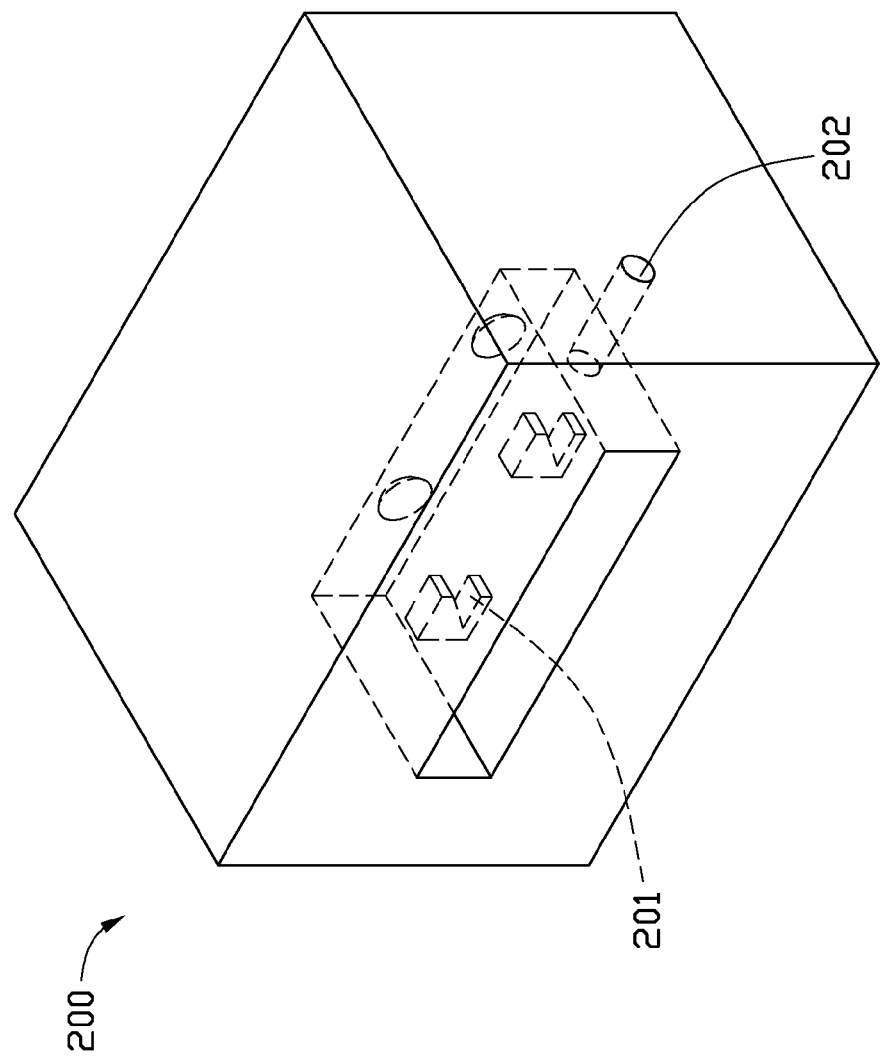
FIG. 4 is a schematic view of the cavity mold of a mold for molding an optical fiber connector, according to the second embodiment.

FIG. 4 shows a cavity mold 200 of the mold according to a second embodiment. The cavity mold 200 is similar to the cavity mold 20 of the first embodiment except that the sprue hole 202 is defined in the sidewall of the cavity mold 200. Of course, the direction of the opening of the cutout 201 also towards the sprue hole 202.

Figure 5:
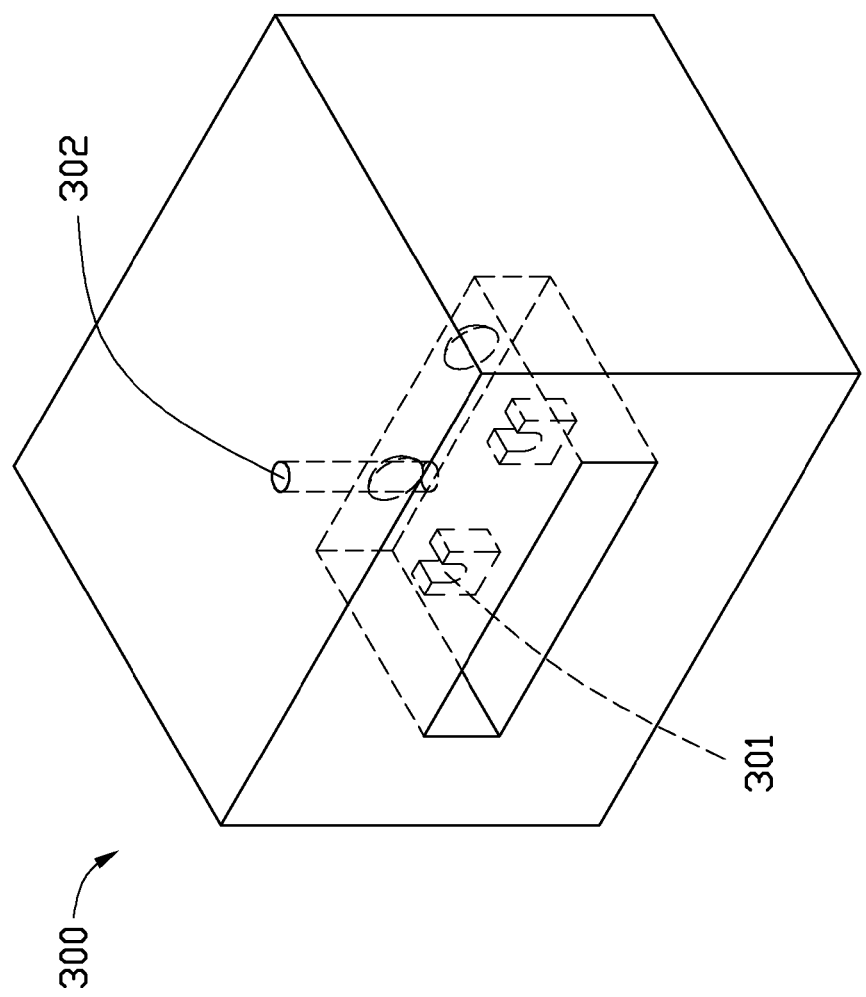
FIG. 5 is a schematic view of the cavity mold of a mold for molding an optical fiber connector, according to the third embodiment.

FIG. 5 shows cavity mold 300 according to a third embodiment. The cutouts 301 are U-shaped and the opening of the cutouts 301 is set towards the sprue hole 302. It is to be understood that in alternative embodiments, the shape of the cutout can be different.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mold for forming an optical fiber connector which includes a blind hole and a lens aligned with the blind hole, the mold comprising:
   a core pin including an insertion portion and a blind hole forming portion;
   a core mold defining a hole for receiving the insertion portion; and
   a cavity mold attached to the core mold, the cavity mold and the core mold cooperatively defining a molding cavity for forming the optical fiber connector, the cavity mold including a lens forming portion in the molding cavity, the core pin aligned with the lens forming portion and the blind hole forming portion thereof exposed in the molding cavity, the cavity mold comprising a support block in the molding cavity, and a sprue hole communicating with the molding cavity, the sprue hole configured for introducing molding material in the molding cavity, a cutout defined in the support block and configured for retaining the blind hole forming portion and maintaining alignment between the core pin and the lens forming portion, the cutout opening toward the sprue hole.

2. The mold of claim 1, wherein a central axis of the sprue hole is perpendicular to the longitudinal axis of the core pin.

3. The mold of claim 1, wherein the cutout has a V-shaped cross-section.

4. The mold of claim 1, wherein the cutout has a U-shaped cross-section.

* * * * *